United States Patent [19]

Eich et al.

[11] Patent Number: 4,886,718

[45] Date of Patent: Dec. 12, 1989

[54] DEVICE FOR REVERSIBLE OPTICAL DATA STORAGE

[75] Inventors: Manfred Eich, Frankfurt; Joachim Wendorff, Nauheim, both of Fed. Rep. of Germany

[73] Assignee: Röhm GMBH Chemische Fabrik, Darmstadt, Fed. Rep. of Germany

[21] Appl. No.: 10,546

[22] Filed: Feb. 3, 1987

[30] Foreign Application Priority Data

Feb. 4, 1986 [DE] Fed. Rep. of Germany ....... 3603266

[51] Int. Cl.$^4$ .......................... C09K 19/00; G02F 1/03
[52] U.S. Cl. ......................................... 430/20; 430/19; 430/1; 252/299.6; 252/299.64; 252/299.66; 252/299.67; 252/299.68; 350/350 R; 428/1
[58] Field of Search .................... 428/1; 430/20, 19; 252/299.6, 299.64, 299.66, 299.67, 299.68; 350/350 R

[56] References Cited

U.S. PATENT DOCUMENTS

| | | | |
|---|---|---|---|
| 4,232,951 | 11/1980 | Aharoni et al. | 350/350 R |
| 4,384,016 | 5/1983 | Ide et al. | 428/1 |
| 4,394,498 | 7/1983 | Kastelic | 428/1 |

FOREIGN PATENT DOCUMENTS

| | | |
|---|---|---|
| 0044893 | 2/1982 | European Pat. Off. . |
| 0065869 | 12/1982 | European Pat. Off. . |
| 2079304 | 1/1982 | United Kingdom . |
| 2094822 | 9/1982 | United Kingdom . |
| 2146787 | 4/1985 | United Kingdom . |

OTHER PUBLICATIONS

The Transactions of the IECE of Japan, vol. E61, No. 6, p. 493.
Kubota et al., Hologram Memory Using ONe Dimensional Fourier Transform-Image Hologram.

*Primary Examiner*—Paul R. Michl
*Assistant Examiner*—Cynthia Hamilton
*Attorney, Agent, or Firm*—Oblon, Spivak, McClelland, Maier & Neustadt

[57] ABSTRACT

The invention relates to a device for reversible optical information storage, which comprises polymeric liquid crystals as a storage medium. The device contains a film comprised of a liquid crystal main chain polymer, as a storage medium, and is constructed so that in the storage operation the storage medium is locally reoriented, and the information is stored by means of a local variation of the molecular ordering.

17 Claims, 1 Drawing Sheet

DEVICE FOR REVERSIBLE OPTICAL DATA STORAGE

BACKGROUND OF THE INVENTION

1. Field of the Invention

The invention relates to a device for reversible optical data storage, employing polymeric liquid crystals.

2. Discussion of the Background:

In certain substances there exist intermediate phases between the solid crystalline phase and the fluid melt. The term "fluid melt" is hereinafter referred to as the "isotropic melt". These intermediate phases combine properties of the ordered crystalline state and the unordered molten state, with regard to structural and dynamic phenomena. Thus, these phases are fluid but they have, for example, optical properties which are characteristic of most crystalline or partially crystalline materials, i.e., they are birefringent. Quite understandably, they are described as "intermediate phases", "mesophases", or "liquid crystal phases". These intermediate phases can be obtained by varying the temperature (wherewith they are designated as "thermotropic liquid crystals") or in solution by varying the concentration. Hereinafter, only thermotropic liquid crystals will be considered. To characterize these intermediate phases, one generally specifies the transition temperatures (determined calorimetrically or by a polarized light microscope) of transitions from the crystalline state to the liquid crystal state, and from the liquid crystal state to the isotropic melt ("clear point"). In addition, if different liquid crystal states are present, all transition temperatures are given.

The occurrence of mesophases associated with peculiarities in the molecular geometry. Spherically symmetric molecules cannot form mesophases, but molecules which can be described as having a roughly cylindrical or disc shape can form mesophases. Such molecules may be rigid, and the ratio of their maximum to minimum dimension (e.g., cylinder length to cylinder diameter) must clearly exceed a critical ratio value of about 3.

In the simplest case for cylindrically shaped molecules, the structure of such mesophases is characterized in that the so-called "nematic" phase the molecular centers have an unordered distribution as in an isotropic melt, whereas the longitudinal axes of the molecules are mutually parallel. This is different from the state in the isotropic melt, where the orientation of the molecules is statistically distributed. The result is mechanical, electrical, and also optical properties which are anisotropic. In the "cholesteric" phases, there is an additional ordering principle comprised of a continuous helical variation of the orientation direction of the longitudinal axes of the respective molecules, which leads to special optical properties such as strong optical activity or selective reflection of light. In the so-called "smectic" phases, in addition to the above-described orientation ordering characteristic of the nematic state there occurs a regular disposition of the centers of gravity of the molecules in space, e.g., only along one spatial axis, or in other smectic modifications along two or even three mutually independent axes. These phases are nonetheless still fluid.

Disc-shaped molecules can form so-called "discotic" phases, in which either only the disc normals are mutually parallel, or the discs are disposed in regular or irregular fashion within columns. In this case, one speaks of "columnar structures".

A characteristic parameter of liquid crystal structures, and one which is very important for the present invention, is the "orientation ordering parameter", which is a measure of the level of orientation order. Its value lies between zero (completely random orientation as in the isotropic melt) and unity (perfect parallel orientation of all molecular longitudinal axes).

The widespread use of liquid crystal substances in industrial and technical products, e.g., display elements in calculators, wristwatches, and digital measuring devices, is based on their ability to easily change the orientation direction (which may be represented by the so-called "director") by applying an external electric, magnetic, or mechanical field. The changes in optical properties which are produced by such external fields can be utilized for information display, when such optical effects are combined with other components such as polarizers, cell walls, etc., in display devices. The cell walls serve to protect the fluid mesophases, and impose the required macroscopic shape on the liquid crystal film.

In recent years it has been recognized that for many areas of application it can be advantageous to combine the properties of liquid crystal phases with those of polymers. Polymer properties considered advantageous are good mechanical characteristics (which enable such substances to be processed into thin films with a stabile shape) and the occurrence of a solidification process (glass transition) which enables a predetermined orientation structure to be fixed. Another parameter, the glass temperature ($T_g$), characterizes the existence of the solidified liquid crystal phase. Above this temperature, the polymer has a viscoelastic or cohesive elastic state.

Theories of the formation of liquid crystal phases in general and of the formation of such phases in polymer systems in particular, as well as experimental results, indicate that the means of producing liquid crystal polymers generally involve the use of rigid mesogenic structural units of the type characteristic for low molecular weight liquid crystals, along with flexible spacer groups and flexible chain molecules. In this way, a wide variety of structural schemes is possible. In the side-chain class of liquid crystal polymers, the mesogenic groups are attached to a flexible or semi-flexible main chain, with or possibly without a flexible spacer. The mesogenic groups used may comprise cylindrical shaped or disc shaped groups. The main chain itself may also contain mesogenic groups which are separated by flexible units. Copolymers characterized by various different spacers and/or mesogenic groups occurring within a single polymer may also form liquid crystal phases.

In addition to these side-chain liquid crystals, main-chain polymers can form liquid crystal phases under certain conditions. These conditions are, namely, that the chains are either completely comprised of rigid groups or of rigid and flexible groups. Copolymers comprised of different mesogenic groups and/or spacer groups also enable liquid crystal phases to be formed. The mesogenic groups may be somewhat cylindrical or rod-shaped. It is possible to adjust to some extent, in advance, the nature of the mesophases and the existence domain of these phases and of the glass state, by means of the structure of the mesogenic groups, the length and flexibility of the spacers, the flexibility of the main chain, and also the ordering of the sequence of units and length of the main chain.

Thus far virtually the only liquid crystal polymers which have been marketed are main chain copolymers with exclusively rigid units, or with predominantly rigid units. They have extremely high strength and stiffness parameters. The term used for these polymers is "self-reinforcing thermoplastics". They are used for industrial parts requiring outstanding mechanical properties. See Kirk-Othmer, "Encyclopedia of Chemical Technology", 3rd Ed., Vol. 14, pp. 414–21 (1984); Wendorff, J. H., *Kunststoffe*, 73:524–8 (1983); and Dobb, M. G., and McIntyre, J. E., *Adv. Polylm.Sci.*, 60/61:61–98 (1984).

Polymers with both flexible and rigid units have not yet been employed in systems which have reached the market. The advantage lies in the high value of the orientation ordering parameter, compared to that of side chain liquid crystals. See Noel, C., Laupretre, F., Friedrich, C., Fagolle, B., and Bosio, L., *Polymer*, 25:808–14 (1984); Wunderlich, B., and Grebowicz, I., *Adv. Polym. Sci.*, 60/61:1–60 (1984); and Kirk-Othmer, loc. cit.. Polymers with mesogenic side groups have attracted strong interest recently. See Clough, S.B., Blumstein, A., and Hsu, E. C., *Macromolecules*, 9:123 (1976); Tsekov, V. N. et al., *Europ. Polym. J.*, 9:481 (1973); Strzelecky, L., and Libert., L., *Bull, Soc. Chim. France*, 297 (1973); Finkelmann, H., in "Polymer Liquid Crystals" (1982); Frenzel, J., and Rehage, G., *Macromol. Chem.*, 184:1689–1703 (1983); *Macromol. Chem. Rapid Commun.*, 1:129 (1980); Hoppner, D., and Wendorff, J. H., *Angew. Makromol. Chem.*, 125:37–51 (1984); German OS 27 22 589, OS 28 31 909, OS 30 20 645, OS 30 27 757, and OS 32 11 400; and European OS 90 282.

U.S. Pat. No. 4,293,435 discloses an industrial use of the specific behavior of liquid crystal polymers which is associated with the transition to the vitreous state. In that application, information is stored by making use of conditions which change the configuration and orientation of the liquid crystal polymers in a predetermined manner, the conditions being, e.g., electric and magnetic fields, and/or pressure. This is also discussed in British Pat. No. 2,146,787. It is noted that the storage of the device in the solid state below the glass temperature ($T_g$) implies that $T_g$ is above normal room temperature ($T_a$), i.e., that the polymer system must be employed at temperatures on the order of 100° C. above $T_a$ if it is desired to record the incoming information within a reasonable response time. Such temperatures are technically inconvenient. Over a period of time, they in fact result in decomposition of the polymer. According to British Pat. No. 2,146,787 these problems can be avoided if certain polymeric side chain liquid crystals are employed. It is then no longer necessary to maintain the temperature in a range below $T_g$ in order to preserve the device, but rather it should be possible to store the device for many years at temperatures above $T_g$ and below a temperature ($T_f$) at which the polymer material begins to become fluid.

$T_f$ can be determined by following the transmission of light through a liquid crystal polymer between two crossed polarizing filters as the temperature is increased from $T_g$. At a few degrees Centigrade below the smectic-to-isotropic phase transition the transparency will increase suddenly. This increase is due to the passage from an anisotropic (but less transparent) state to a highly birefringent (but transparent) state. The temperature above this temperature $T_f$ are referred to as the "fluid region". As the temperature is increased the transparency also increases, until it reaches a maximum of $T_m$. $T_m$ marks the point at which the isotropic (clear) phase first appears.

Since the appearance of the isotropic phase leads to extinction of the light in the presence of the crossed polarizers, further increases in temperature are accompanied by a drop in transparency, as the isotropic regions within the plastic mass increase in size. Eventually the so-called "clear temperature" is reached, at which the last remnants of the structure responsible for the birefringence have disappeared.

In British Pat. No. 2,146,787, a device is claimed which is comprised of a layer of material which contains a liquid crystal polymer with a mesogenic side chain; is further comprised of devices to thermally convert at least part of the material from the viscous state wherein the temperature of the material is in the range $T_g$ to $T_f$ to the fluid region; and is further comprised of devices to influence at least part of the material in the fluid region in order to produce a selective change in the texture of the molecules, thereby imparting information which is retained even after the material is cooled out of the fluid region and returns to the viscous state. Accordingly, an essential precondition with the British Patent is that the temperature parameters of the polymer material obey the relation $T_f > T_a > T_g$. A device is also described in which the material layer contains a liquid crystal polymer with a smectogenic side chain. Particularly preferred are polymeric liquid crystals of the polysiloxane type, with diphenylcyanogen side chains or benzoic acid ester side chains.

As in the past, there is currently great interest in optical storage media which have high display density and are capable of reversible storage. The above-described solutions to the problem of optical data storage represent relatively narrow technical answers. Thus, the device according to British Pat. No. 2,146,787 depends on the use of liquid crystal side chain polymers with the crucial precondition that the temperature be chosen such that the polymer material is in a viscous region. The refinements disclosed therein extend to polysiloxane liquid crystals, preferably with diphenylcyanogen side chains or benzoic acid ester side chains. The information storage is not reliable, due to the molecular mobility which is present, the finite relaxation times associated therewith, and the possibility of influencing the system, e.g., by spurious fields. Also, it would be desirable to have a system which could be implemented without such tight restrictions on parameters.

SUMMARY OF THE INVENTION

Accordingly, one object of the present invention is to provide a device for reversible optical information storage which does not depend on the polymer material being in a viscous region.

Another object of the invention is to provide a device for reversible optical information storage which is reliable and not subject to the influence of spurious fields.

A further object of the invention is to provide a device for reversible optical data storage in which information can be repeatedly stored and read without decomposition of the device.

Still a further object of the invention is to provide a device for reversible optical information storage which utilizes polymeric liquid crystals.

Yet another object of the invention is to provide a device for reversible optical information storage which is versatile and can be used in a variety of applications such as, for example, optical signal processing, Fourier transformation and Fourier convolution, the production of image and imaging systems, the generation and storage of holograms and coherent optical correlation techniques.

These objects and other objects of the present invention which will become apparent from the following specification have been achieved by the novel device for reversible optical information storage of the present invention which comprises:

(i) a substrate; and (ii) a film in contact with the substrate, wherein said film comprises a liquid crystal main chain polymer in an oriented or disoriented state; and wherein the information is stored in the film by locally reorienting the said state of the film, whereby the reorienting produces a local variation of the ordering of the polymer.

The present invention also encompasses a method of reversible optical information storage using this device comprising the steps of:

(a) storing information by illuminating the film with a holographic interference pattern, wherein the pattern comprises the direction, amplitude and phase of light scattered by an object, wherein the direction, amplitude and phase are relative to a reference light beam from the same light source, and (b) reading the stored information from the film by illuminating the film with coherent monochromatic light.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
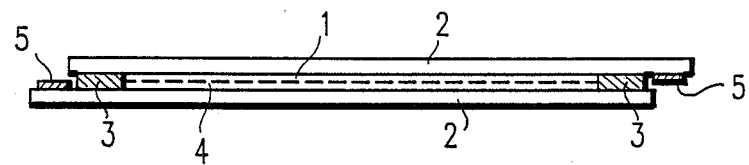
FIG. 1 illustrates a preferred embodiment of the device for reversible optical information storage in which a film of a polymeric liquid crystal is located between two substrate plates.

The inventive device has been found to afford a particularly advantageous data storage means. The inventive device for reversible optical information storage, using polymeric liquid crystals as the storage medium, is comprised of a film of a liquid crystal main chain polymer, which film is employed as the storage medium.

The optical information is stored by using a laser beam to produce a local reorientation or disorientation. Preferably the storage medium containing a liquid crystal main chain polymer is part of a device.

The device is set up to store the information by means of selective variation of the spatial ordering and/or orientation of the liquid crystal main chain polymer.

Polymeric main chain liquid crystals, in comparison with side chain polymers, have the advantage of a higher degree of orientation ordering, which leads to higher contrasts and diffraction efficiencies.

The temperature of the storage medium in which the information is stored is generally in the range of the spatially stable state below the glass temperature ($T_g$) of the liquid crystal main chain polymer. Alternatively, the temperature of the storage medium in which the information is stored may be in the viscoelastic region above the glass temperature of the liquid crystal main chain polymer. The resulting macroscopically isotropic region is frozen below the glass temperature. The scattering centers and/or reoriented zones which are produced can be read as optical information.

The requirements for the structure of a liquid crystal polymer in order to effect the various orienting processes are documented in the literature. Thus, for example, a homotropic orientation in an electric field requires a positive dielectric anisotropy for the frequency range employed. On the other hand, a homogeneous orientation can often be produced from a structured polyimide by boundary surfaces. Mesogenic groups with anisotropic form are required for this. See Kelker, R., and Hatz, R., "Handbook of Liquid Crystals", Verlag Chemie (1981); Pranoto, and Haase, W., *Mol, Cryst. Liq. Cryst.*, 98:299-308 (1983); Zentel, R., and Ringsdorf, R., *Makromol. Chem.*, 182, 1245-56 (1982); and Griffin, A., and Johnsen, J. F., "Liquid Crystals and Ordered Fluids", Vol. 4, Plenum Press, New York (1984).

The Liquid Crystalline Polymers

The inventively applied liquid crystal main chain polymers ("LCMPs") generally obey the rule that the chain should be constructed of relatively rigid mesogenic groups and flexible spacer groups. The rigid and flexible groups should generally alternate in regular fashion along the chain.

However, in many cases it may be advantageous for the structural scheme to be varied such that the chain comprises spacer groups of various lengths, and various mesogenic groups, wherewith these structural units may recur regularly or in disordered fashion along the chain. These polymers are generally formed by condensation or polycondensation. The polycondensation products are of particular interest and importance.

The following types of polycondensation products are examples of polymers useful in the present invention.

Polyester Type

A. A diol (I)

HO—M—OH,  (I)

which contains the mesogenic unit M, is polycondensed with an aliphatic dicarboxylic acid of formula (II)

HOOC—(CH$_2$)$_n$—COOH,  (II)

where n is a number from 2 to 20. The compound having formula (II) will generate the spacer.

Basically the mesogenic units M are related to the free low molecular weight mesogenic compounds of the state of the art.

Preferably, the mesogenic units M contain 2 phenyl groups which are connected directly or via a bridge, in accordance with the following formula:

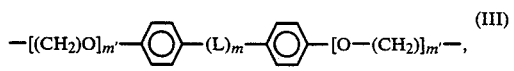

$$-[(CH_2)O]_{m'} - \phantom{O} - (L)_m - \phantom{O} - [O-(CH_2)]_{m'} -, \quad (III)$$

where L represents $$-CH=N-,\ -N=N-,\ -\overset{\overset{O}{\uparrow}}{N}=N-,\ -\overset{\overset{O}{\uparrow}}{CH}=N-,$$

$$-CH=CH-,\ -C\equiv C-,\ -O\underset{\underset{O}{\|}}{C}-,\ -HC=\underset{\underset{CH_3}{|}}{C}-,$$

$$-\underset{\underset{CH_3}{|}}{CH}=N-N=\underset{\underset{CH_3}{|}}{CH}-,$$

or a phenyl group; and m and m' are 0 or 1. One or both phenyl groups may be multiply and symmetrically substituted, e.g., with methyl groups or halogen (e.g., chlorine, bromine, etc.).

B. A dicarboxylic acid of formula (IV)

$$HOOC-M'-COOH, \quad (IV)$$

containing the mesogenic unit M', where M' has the same meaning as M in the formula (II) and (III), except that as a rule m'=0. The dicarboxylic acid is polycondensed with an aliphatic diol of formula (V)

$$HO-A-OH, \quad (V)$$

where A represents an alkyl chain with 2-20 chain members, which may bear $C_1$ and $C_2$ alkyl substituents, and may contain one or more ether oxygen bridges.

C. A diisocyanate of the formula (VI)

$$O=C=N-M''-N=C=O, \quad (VI)$$

containing the mesogenic unit M'', where M'' has the same meaning as M in formula (I), preferably:

[structure: biphenyl with CH3 substituents]

The diisocyanate is polycondensed with the aliphatic diol of formula (V).

D. A bisphenol derivative of formula (VII)

[structure: HO–phenyl–O–(CH2)p–O–phenyl–OH] (VII)

where p is a number from 2 to 20, preferably from 2 to 12; or a substituted hydroquinone of formula (VIII)

[structure: HO–phenyl(R')–OH] (VIII)

where R' represents methyl, phenyl, chloro, or bromo; a phenyl compound; a diol of formula (I), particularly with m, m'=0; or a compound of formula (IX)

[structure: binaphthyl diol HO...OH] (IX)

is polycondensed with terephthalic acid or a diphenyldicarboxylic acid of formula (X)

$$HOOC-\phenyl-O-(CH_2)_{p'}-O-\phenyl-COOH \quad (X)$$

where p' is a number from 2 to 20, preferably from 2 12.

E. A dianiline of formula (XI)

$$H_2N-\phenyl-O-(CH_2)_p-O-\phenyl-NH_2 \quad (XI)$$

where p has the meaning given above, is polycondensed with terephthalic aldehyde, to form a Schiff base.

In addition to the above chemical structures, the following are further examples of polymers which lead to the formation of liquid crystal phases.

Polyesteramide Type $$+O-\phenyl-\underset{\underset{H}{|}}{N}-\underset{\underset{O}{\|}}{C}-\phenyl-O-X_{n'}-O-\phenyl-\underset{\underset{O}{\|}}{C}+$$

where $X_{n'}$ represents flexible spacer units and n'=2 to 20.

Polysiloxane Type $$+SiO+_{\overline{x}}\underset{\underset{CH_3}{|}}{\overset{\overset{CH_3}{|}}{Si}}-(CH_2)_{n''}-O-\phenyl-\underset{\underset{O}{\|}}{C}-O-M-O-\underset{\underset{O}{\|}}{C}-\phenyl-O-(CH_2)_{n''}-$$

where M represents a mesogenic group, and n'' is a number of analogous to n.

Also useful in the invention are polymers produced from disc-shaped mesogenic groups and flexible groups. See Watanabe, I., and Krigbaum, W. R., *J. Polym. Sci., Polym. Phys. Ed.*, 23:565-74 (1985); Blumstein, A., *Polym. J.*, 17:277-88 (1985); Clough S. B., Blumstein, A., and Hso, E. C., *Macromolecules*, 9:123-7 (1976); Noel, C., Laupretre, F. L., Friedrich, B., Fayolle, B., and Bosio, L., *Polymer*, 25:808-14 (1984); and Lenz, R. W., *Polym. J.*, 17:105-55 (1985).

The polycondensation is carried out in known fashion. In the esterification reactions of types A and B above, acid or base catalysts may be used to adjust the ester equilibrium, e.g., by means of strong acids (such as p-toluenesulfonic acid), metal oxides, alkali or alkaline earth salts of weak acids, or alcoholates. As an option, the polymerization may be carried out in the melt.

In general the molecular weights of the polycondensates are in the range 1,000 to 20,000, as determined by gel permeation chromatography.

The glass temperature of the liquid crystal polymers of the invention is generally in the range $-40°$ to $+110°$ C. For a reference regarding the glass temperature, see Brandrup, I., and Immergut, E. H., "Polymer Handbook", 2nd Ed., John Wiley, pp. 111-39 (1975).

The Device

The main chain polymer proposed for the information storage process must have absorption properties which can be adjusted to the wavelength of the writing laser. This can be accomplished, for example, by mixing in a suitable dye, or polymerizing a dye into the polymer chain. In this regard, the dye molecule itself may in fact have mesogenic properties. Preferably, a polymeric liquid crystal is used on which the mesogenic groups themselves absorb in the required wavelength, representing the extreme case of a mesogenic dye which is incorporated to the extent of 100% in the polymer. The required extinction of the storage medium is adjusted by way of adjusting the dye concentration.

Suitable dyes are known from the literature, and are suitable dyes for mixing into the liquid crystal phase, and which satisfy a number of conditions simultaneously. See for example, Constant, J. et al., *J. Phys. D: Appl. Phys.*, 11:479 ff. (1978); Jones, F. et al., *Mol. Cryst. Liq. Cryst.*, 60:99 ff. (1980); and European OS 43 904, OS 55 838, and OS 65 869. The dyes should not ionize under the action of an electric field. They should have as high a molecular extinction coefficient as possible, and at the same time they should have good solubility in the liquid crystal matrix used, i.e., in the storage medium. They must also be chemically stabile. Dyes with the required characteristics are found, for example, in the anthraquinone class. See European OS 56 492, OS 44 893, OS 59 036, and OS 54 217.

Suitable azo dyes are disclosed in, for example, German OS 34 06 209. The amount of dye in the storage medium is preferably in the range of 1-50 wt. %.

Polymers with mesogenic groups and dye groups in the side chain are claimed in European OS 7 574 and OS 90 282, and European Al 40 133. See also Ringsdorf, H., and Schmidt, H. W., *Makromol. Chem.*, 185:1327-34 (1984); and Reck, B., and Ringsdorf, H., *Macromol. Chem. Rapid. Commun.*, loc. cit.) Analogously to the above-described polymeric liquid crystals (PLCs) of formula (I), the repeating units

can form the main chain elements of the dye-containing monomer units. In such cases the dye group Y' is contained in the corresponding monomer

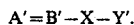

An example of a mesogenic group M which is also a dye group is

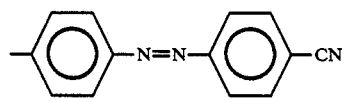

Preferably a spacer group $-(CH_2)_6-$ is also present. In principle, the polymer may be employed in the form of a thin layer film or laminate, as a coating on a rigid or flexible matrix layer. The thickness of the film which contains or comprises the polymeric liquid crystals is preferably in the range $10^{-3}$ to $10^{-6}$m. In the configuration illustrated in FIG. 1, the device consists of an information storage cell (1) comprised of two planar transparent plates (2) disposed in parallel, preferably glass plates, a suitable distance apart. The distance is generally <1 mm and is preferably about 1 micron. The surface area is in the range from a few cm² to a few dm². The two internal surfaces of the glass plates (2) are conductively coated with $InO_2/SnO_2$ by vapor deposition, and a conducting contact to the outside is fabricated. The thus prepared glass plates (2) are fixed with the aid of a temperature-stabile adhesive, e.g., a silicone adhesive, such that a cell-like inner space is formed, with only an inlet and an outlet which are each a few millimeters wide.

The desired distance (4) between the two plates (2) is fixed by means of two suitable spacing members (3) of appropriate dimensions, which are preferably comprised of a polyimide plastic material. The information storage cell also has electrodes (5). After the adhesive is dried, the cell is placed in a heatable apparatus and is filled with the liquid crystal polymer which is in the isotropic state. Preferably this polymer is of formula (I). The residual open cell space is filled completely with the polymer melt, by capillary action.

The advantage of this technique over a technique using a cell which is left partially open during the filling is, among other things, the fact that it reliably prevents formation of air bubbles. In addition, one can inexpensively produce standardized cell structures with a geometry which can be varied within certain limits, i.e., varied as to, for example, outer diameters and separation distances. These structures are then filled in a second step with suitable liquid crystal polymers when completed cells are needed. The orientation occurs in known fashion, by application of an oriented field (alignment field), particularly a magnetic field, or especially an electric field; or by surface action. The desired orientation can also be produced by suitable shear strain or stretching. In the case of the application of an electric field, which is the preferred method, an a.c. voltage is applied to the information storage cell (1) which has been filled as described above. This voltage is applied while the cell is at a temperature above $T_g$, and the cell is then cooled to room temperature while retaining the applied stress. The result is an oriented liquid crystal film.

The glass temperature ($T_g$) of the liquid crystal polymer is above the room temperature ($T_a$). A temperature of 20° C. may be assumed for room temperature. The information can be read by illuminating the polymer film with monochromatic coherent light. Various orientation possibilities of the liquid crystal polymer film in the inventive device are possible, for the storing of information:

(1) The mesogenic groups are all oriented parallel to the normal of the polymer film layer. This can be brought about by applying an a.c. electric field to the plates (2) which are coated with transparent electrodes, wherewith the electric field is directed parallel to the normal of the polymer film layer; or alternatively by applying a magnetic field; or by manipulating the surface.

(2) The mesogenic groups are oriented parallel to or at an incline to the plane of the film, the parallel to a macroscopically prescribed direction. This can be brought about by coating the plates (2) with a suitable material such as a polyimide and by structuring this coating according to the desired orientation; or by suitably coating the substrate at an angle with silicon dioxide, by a vapor deposition technique.

The required orientation can also be produced by suitable shear strain or elongation.

In both cases (1) and (2), the orientation process is carried out in the liquid crystal state.

The orientation is frozen-in by cooling to the glass state. The information storage cell (1) constructed as described above is the storage medium for storing optical information. The method is essentially based on the local, selective variation of the ordering state of the polymeric liquid crystal molecules in the storage medium in which they are contained.

The liquid crystal film contained in the storage medium can be present in macroscopically oriented or disoriented form. The variation of the state of ordering can be accomplished by local electrical, magnetic, or surface-acting fields. In this regard, the storage medium can be heated locally or overall, with a heat source. If the heat source is used selectively and locally, the variation of the state of ordering can be induced by field (electrical, magnetic, or surface-acting) which acts over the entire extent (entire dimension) of the storage medium. Particularly preferred applications are based on the scattering center effect and nonlinear optical effects, i.e., optically induced Frederiks transitions.

The Process of Information Storage

Scattering Center Method:

The simplest technique for writing information is essentially based on the generation of scattering centers, by means of a focused laser beam which locally converts the oriented, liquid crystal polymer layer to the isotropic phase. The locally produced macroscopic isotropic region is frozen-in below the glass temperature, or else remains in the viscoelastic temperature region above $T_g$. Preferably, the procedure is as follows.

According to the invention the film formed from the liquid crystal polymer is heated locally from room temperature at the interference maxima of an interferometrically generated grid, such that the polymer is converted to the isotropic phase. A laser beam is employed, e.g., light at 514.5 nm from an argon laser. Also, a focused laser beam can be used, wherewith the laser beam and the storage medium are moved in a defined manner relative to each other.

Removal of the laser beam and subsequent cooling lead to a stabile disoriented (macroscopically isotropic) region. The scattering centers which have been produced can be read to yield optical information. The reading process is carried out analogously, with another laser beam of suitable wavelength and intensity, so that the stored information is not altered. The absorption properties of the storage medium are advantageously chosen such that the information can be recorded with one laser beam of suitable wavelength and intensity and can be read with another laser beam of different wavelength without altering the information when it is read. The test arrangement for evaluating the storage properties of the described information storage cell is based on a Mach-Zehnder interferometer (See "Encyclopaedie Naturwissenschaft und Technik", Vol. 2, Verlag Moderne Industrie, 1980). With this interferometer, sinusoidal intensity grids with line distances between 1.0 and 100 micron are produced, for interference of two linearly polarized plane partial waves. The intensity distribution is obtained, with the use of a convex lens, by superposing a planar wave with a spherical wave, in a manner analogous to the use of a Fresnel zone plate.

Nonlinear Optical Effect (Optically-Induced Frederiks Transition)

The electric field of the linearly polarized writing laser light source induces a local modulation of the index of refraction, as a result of the polarizability anisotropy of the liquid crystal molecules. This local modulation can then be read as a phase object by a second laser beam (a linearly polarized beam from a He-Ne laser). This is achieved by intentional local reorientation of the liquid crystal molecules in the optical field. The reorientation (optically induced Frederiks transition) occurs at a temperature above the glass temperature of the liquid crystal polymer in an anisotropic phase. Upon subsequent cooling, the index of refraction structure freezes-in below $T_g$, becoming a phase object. The film can remain visually completely clear in this process.

The desired temperature can be produced by external heating, in which the frequency of the writing beam is of no critical significance. However, the temperature is preferably attained by absorption of the writing beam; and cooling occurs when the laser beam is removed (i.e., the laser is shut off). Accordingly, the writing beam should meet the following two conditions:

(a) The optical field strength at the interference maxima must be greater than the "Frederiks threshold voltage" for the chosen liquid crystal polymer; and (b) The intensity must be chosen such that the absorption heating at the interference maxima results in the polymer being heated at the maxima above the glass temperature but not above the temperature of the nematic-to-isotropic phase transition ($T_{NI}$).

By proper matching of laser wavelengths and liquid crystal polymers, one may go beyond purely binary information with maximum possible reorientation, to employ various degrees of reorientation, which corresponds to continuous phase modulation.

An extremely interesting aspect of the present method, from the industrial standpoint, is that a phase object with high diffraction efficiency is produced. This is of essential importance in optical analog technology, e.g., conventional holography and synthetic holography.

The test arrangement for evaluating the storage properties of the described information storage cell is based on a Mach-Zehnder Interferometer (see "Encyclopaedie Naturwissenschaft and Technik". loc. cit.).

Erasure of Stored Information

Basically, the stored information can be erased by increasing the temperature (to above $T_{NI}$) and cooling in an electric or magnetic field. Stored information can also be erased locally by increasing the temperature and then cooling in an electric or magnetic field, whereby the original orientation state is restored in the local region. Alternatively, all the recorded information can be erased and the original state can be restored, by increasing the temperature of the storage medium and cooling in an electric or magnetic field.

The preferable procedure is as follows: Analogously to the preparation for the first writing process, the information stored in the liquid crystal polymers is erased by heating the information storage cell (1) to above $T_g$ and then cooling, with an a.c. voltage applied (500 V, 1 KHz). When repeated writing and erasing processes are carried out, no irreversible changes in the information storage cell are detected at any step of the process.

Reversible Analog Data Storage

As mentioned above, the use of the nonlinear optical effect affords the opportunity for analog storage of data, reading of the data by optical means, erasing, and rewriting other data on demand. Holographic methods are used for storing the data in the inventive storage medium. As a rule, the information to be stored comprises pictorially representable structures, e.g., objects or two-dimensionally organized images such as printed pages or graphic images. Accordingly, the structure to be stored as information is illuminated by a coherent, monochromatic light source. The interference pattern, which is determined by the direction, amplitude, and phase of the light from the structure to be stored as information, relative to a reference light beam from the same light source, is recorded in the macroscopically oriented film comprised of liquid crystal polymer. The thickness of the liquid crystal polymer film is also preferably between 1 and 20 micron here. The material for construction of the planar parallel transparent plates may be transparent plastic (e.g., polymethyl methacrylate) or preferably inorganic glass.

Preferably, dyes are present in the information storage medium. These may be components of the liquid crystal polymers or may be mixed into and distributed in the storage medium. The glass temperature ($T_g$) of the liquid crystal polymers is above room temperature ($T_a$). The information can be read by illuminating the polymer film with monochromatic coherent light. Various orientation possibilities of the liquid crystal polymer film in the inventive device are possible, for storing the information:

(1) The mesogenic groups are all directed parallel to the normal to the polymer film layer. This can be brought about by applying an a.c. electric field to the plates (2) which are coated with transparent electrodes, in which the electric field is directed parallel to the normal to the polymer film layer; or alternatively by applying a magnetic field; or by manipulating the surface.

(2) The mesogenic groups are oriented parallel to or at an incline to the phase of the film, and parallel to a macroscopically prescribed direction. This can be brought about by coating the plates (2) with a suitable material such as a polyimide and by structuring this coating according to the desired orientation; or by suitably coating the substrate at an angle with silicon dioxide, by a vapor deposition technique.

The required orientation can also be produced by suitable shear strain or elongation.

In both cases (1) and (2), the orientation process is carried out in the liquid crystal state. The orientation is frozen-in by cooling to the glass state.

The information storage is achieved in the manner described above, in which a laser is used as the monochromatic light source, with wavelength in the absorption region of the storage medium. The laser used to read the information has a wavelength which is absorbed by the storage medium to a much lower degree. Writing and reading can be carried out at room temperature, on solid film. Information is erased by heating the sample to the anisotropic or isotropic region above the glass temperature ($T_g$).

Reversible Digital Data Storage

Another embodiment of the invention relates to digital data storage by optical means. Here too one provides for reading by optical means, erasing, and rewriting information. A digital phase structure is produced in the optically clear, pre-oriented liquid crystal polymer film of the storage medium, by means of a monochromatic laser beam. The laser beam and storage medium are moved in a defined manner with respect to each other, and the intensity of the laser beam is modulated. The stored information is read by defined relative movement of the storage medium and a laser beam of contrast intensity and suitable wavelength, which does not change the stored information.

The stored medium is prepared technically with orientation of the polymer in a manner similar to that for reversible analog data storage. Information storage is accomplished in the manner described above, in which a laser is used as the monochromatic light source, with wavelength in the absorption region of the storage medium. The laser used to read the information has a wavelength which is absorbed by the storage medium to a much lower degree. Writing and reading can be carried out at room temperature, on solid film. Information is erased by heating the sample to the anisotropic or isotropic region above the glass temperature ($T_g$).

Reversible Synthetic Holography

A phase structure is produced in a pre-oriented liquid crystal plastic film by digital means, in the manner described above for reversible digital data storage, employing defined relative movement of the writing beam and the information storage medium. However, the reading is carried out differently from the case of digital storage which employs defined relative movement of the reading beam and the storage medium. Rather, the synthetic hologram is illuminated entirely with a reference beam. The information needed to determine the required intensity modulation is computed in advance. The described technique enables phase structures with defined optical properties to be created, e.g., lenses, etc. Because this takes place by computation in digital form, complex operations (e.g., glass grinding and polishing) can be greatly simplified. Also important is the low weight of optical components (e.g., eyeglass lenses and other lenses) manufactured by this technique.

The method and device of the present invention for reversible optical data storage are particularly suitable for use in the area of reversible digital information storage (EDRAW).

Another very interesting application possibly is in the field of analog information processing (holography). One especially promising area of use is industrial process control. Major aspects of product control such as recognition, sorting, and testing can be accomplished rapidly and efficiently on the basis of coherent optical correlations.

Manufacturing the Liquid Crystal Polymers

The inventively employed polymers, particularly those of formula (I), can be manufactured by known methods.

An example is the preparation of a polyester of structure

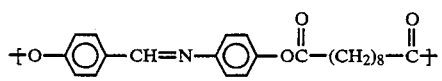

from the aliphatic dicarboxylic acid

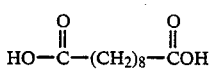

and the bisphenol

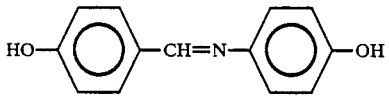

This method is described in Blumstein, A., Sivaramakrishnan, K. N., Blumstein, R. B., and Clough, S. B., *Polymer,* 23:47–53 (1982).

Sebacyl chloride, which is commercially obtainable, is preferably purified by distillation under reduced pressure.

The bisphenol is obtained by condensing 4-hydroxybenzaldehyde with 4-aminophenol, in methanol. The bisphenol is then purified by recrystallization from a mixture of acetone and hexane. To produce the polyester, a solution of the bisphenol, sodium hydroxide, and benzyltriethylammonium chloride in 100 ml water is prepared in a mixer. A solution of sebacyl chloride in chloroform is added to this mixture under intense stirring. After stirring for 15 min., the mixture is poured into methanol. The polymer precipitates out, is purified by filtering and water washing, and is dried in vacuum at 70° C.

Another example is the synthesis of a polyester of structure

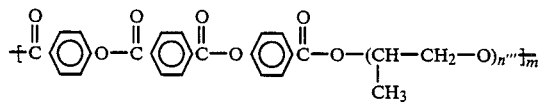

Where $n'''$ is a number from 2 to 20, and m is the number of repeating units (as a rule, $10^2$ to $10^4$). This polyester is synthesized from the dicarboxylic acid

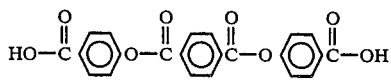

and the diol

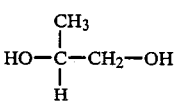

(See Galli, G., Chiellini, E., Ober, Ch. K., and Lenz, R. W., *Makromol. Chem.,* 183:2693–2708 (1982).

The reaction scheme is as follows:

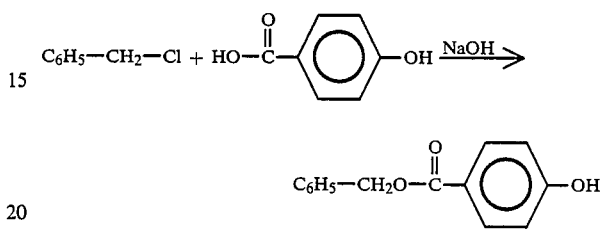

This phenol is reacted with the acid chloride:

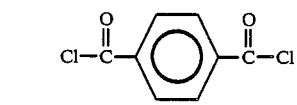

to give the following compound:

The dicarboxylic acid is then obtained by reacting with HBr in trifluoroacetic acid. In the next step, the dicarboxylic acid is reacted with $SOCl_2$, to give the acid dichloride:

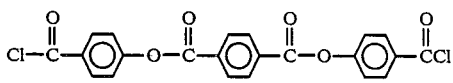

which is then reacted with the aforesaid diol in 1,2-dichloroethane at 60° C., with an excess of pyridine as the acid acceptor, to obtain the polyester.

Still another example is the synthesis of a polyester of structure

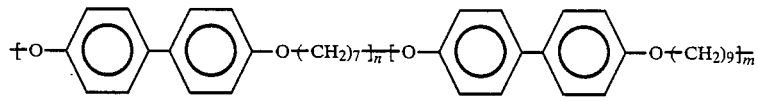

from 4,4-dihydroxybiphenyl, 1,7-dibromoheptane, and 1,9-dibromononane. See Shaffer, T. D., ad Percec, V., *I. Polym. Sci. Polym. Lett. Ed.,* 23:185–94 (1985).

The starting materials are commercially available. The 4,4'-dihydroxybiphenyl in aqueous NaOH solution is added to a solution of 1,7-dibromoheptane and 1,9-dibromononane in nitrobenzene, under vigorous stirring. At 90° C., TBAH* is added and the reaction is continued 10-12 hr. The reaction scheme is as follows.

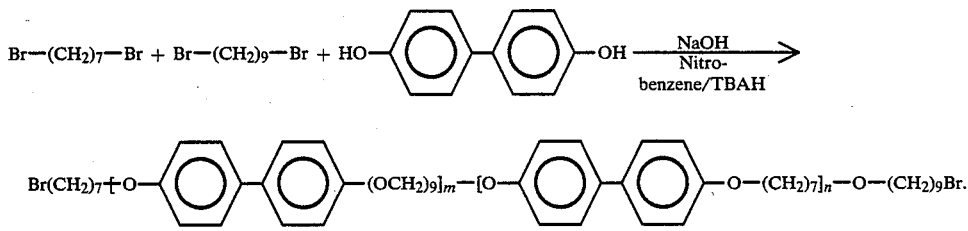

The polymer can be purified by reprecipitation from methanol.

* Tetrabutyl ammonium hydrogen sulfate

As a further example, one might mention the synthesis of a polysiloxane. (See Aquilera, C., Bartolin, J., Hisgen, B., and Ringsdorf, H., *Makromol. Chem.*, 4:253–262 (1983). The product has the structure

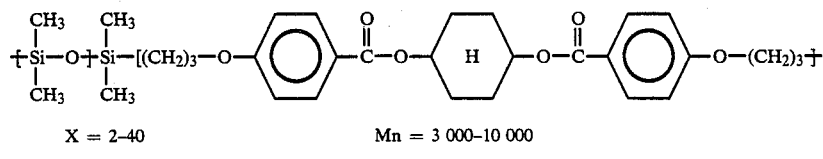

X = 2–40     Mn = 3 000–10 000

It is prepared by reacting

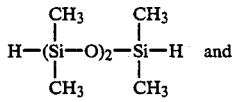  and

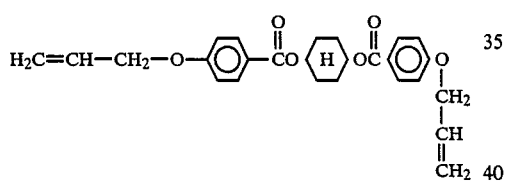

using hexachloroplatinic acid as a catalyst. A copolyester with different spacer lengths or different lengths of the mesogenic groups is obtained by a similar method.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for reversible optical information storage, comprising:
   (i) a pair of transparent substrate plates; and
   (ii) a film in contact with said substrate plates and located therebetween, said film comprising a liquid crystal main chain polyester, polyesteramide or polysiloxane polymer in an oriented or disoriented state; and
   wherein the information is stored in said film by locally reorienting the said state of said film, whereby said reorienting produces a local variation of the ordering of said polymer.

2. The device of claim 1, wherein said film is macroscopically oriented.

3. The device of claim 1, wherein said film is macroscopically disoriented.

4. The device of claim 1, wherein said film is in the shape-stable state below the glass temperature.

5. The device of claim 1, wherein the film is in the viscoelastic state above the glass temperature.

6. The device of claim 1, wherein said polymer has a molecular weight in the range of about 1,000 to 20,000.

7. The device of claim 1, wherein said liquid crystal main chain polymer has a glass temperature in the range of about −40° C. to about 110° C.

8. The device of claim 1, wherein said polymer comprises the reaction product of a mesogenic diol with dicarboxylic acid or diisocyanate monomers.

9. The device of claim 1, wherein said polymer results from reacting
   (i) a bisphenol of formula

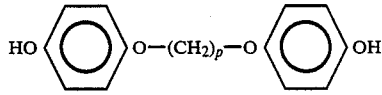

where p is a number from 2 to 20 inclusive,
(ii) a substituted hydroquinone of formula

wherein R' is methyl, phenyl, chloro, or bromo; or
(iii) a compound of formula

with terephthalic acid or a diphenyldicarboxylic acid of formula

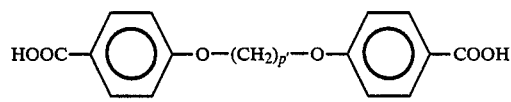

wherein p' is a number from 2–20, inclusive.

10. The device of claim 9, wherein p and p' are 2-12 inclusive.

11. The device of claim 1, wherein said polymer results from the reaction of a dianiline of formula

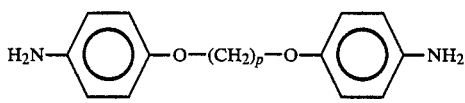

wherein p is a number from 2-20 inclusive, with terephthalic aldehyde, to form a Schiff base.

12. The device of claim 1, wherein said polyesteramide has the formula

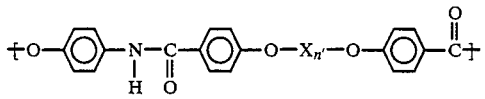

wherein X is methylene or oxygen and n' is 2 to 20, inclusive.

13. The device of claim 1, wherein said polysiloxane has the formula

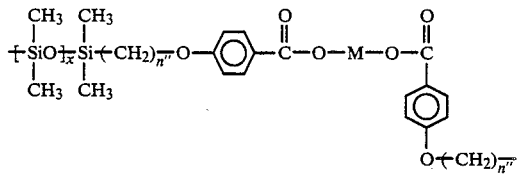

wherein M is a mesogenic group, and n'' is a number from 2-°, inclusive and x is a number from 2 to 40 inclusive.

14. The device of claim 10, wherein said polymer contains monomer units having the formula

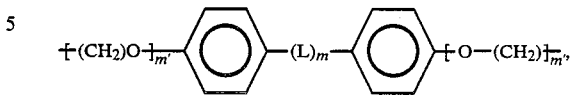

wherein L represents —CH=—, —N=N—, $$-\overset{O}{\overset{\uparrow}{N=N}}-, \quad -\overset{O}{\overset{\uparrow}{CH=N}}-,$$

—CH=CH—, —C≡C—, —OC(O)—, —HC=C(CH$_3$)—, —C(CH$_3$)=N—N=C(CH$_3$)—, phenyl or phenyl multiply and symmetrically substituted with methyl groups or halogen atoms; and m and m' are 0 to 1.

15. A device for reversible optical information storage, comprising:
(i) a pair of transparent substrate plates; and
(ii) a film in contact with said substrate plates and located therebetween, said film comprising a liquid crystal main chain polymer and a dye, whereby the absorption properties of said film are adjusted, said film being in an oriented or disoriented state; and wherein the information is stored in said film by locally reorienting the said state of said film, whereby said reorienting produces a local variation of the ordering of said polymer.

16. The device of claim 15, wherein said dye is incorporated into said polymer as a comonomer unit.

17. The device of claim 15, wherein the extinction level of said film is adjusted by changing the concentration of said dye.